United States Patent Office 3,296,017
Patented Jan. 3, 1967

3,296,017
METHOD OF CHEMICALLY BONDING A METAL TO A CERAMIC
Jack A. Rubin, Encino, Calif., assignor to North American Aviation, Inc.
No Drawing. Filed July 17, 1963, Ser. No. 295,845
15 Claims. (Cl. 117—119.8)

My invention relates to a method of bonding a metal to a ceramic, and more particularly to a method of forming a bond between a metal and a ceramic involving chemical interaction with the bonding composition.

Metal-to-ceramic seals have become increasingly important in the electronic and missile industries. Ceramics have assumed an important role because of their high temperature stability and satisfactory dielectric properties, as compared with other dielectric materials commonly in use, such as glass. Some specific applications of metal-to-ceramic seals are the brazing of ceramic stand-offs and heat sinks to metallic components, the joining of microwave or infrared transmitting windows to metallic components, the joining of ceramic thread guides to metallic components, the coating of certain ceramics with protective metals to prevent volatilization in the presence of water vapor at high temperatures, and fastening of electrical leads to ceramic components.

Ceramics possess excellent resistance to abrasion, high dielectric strength, extreme mechanical strength, and transparency to a wide range of electromagnetic radiation. However, it has been difficult to satisfactorily join a ceramic component to a metallic coating or structural member. A number of methods have been developed for accomplishing ceramic-to-metal seals. These generally involve the use of a refractory metal powder containing an activating substance which is sintered to the ceramic substrate in a hydrogen atmosphere. Commercial hydrogen, which has a certain water content (e.g., 0.5%), is used in the sintering, since a wet atmosphere is necessary to keep the activating substance in an oxidized state. However, many of the better ceramic materials are attacked by water at elevated temperatures. This factor makes the use of wet hydrogen atmospheres highly detrimental. For example, beryllia, boron oxide, and silica are severely damaged by water vapor at elevated temperatures through reactions involving the formation of hydrated oxides.

It is, accordingly, the principal object of the present invention to provide an improved method of forming a metal-to-ceramic seal.

It is another object to provide a method of forming such a seal wherein the ceramic is not chemically attacked by any process reagent.

It is another object to provide a method of forming an improved metal-to-ceramic seal by chemical bonding of seal components with the ceramic substrate.

Still another object is to provide such a process which is performed in an anhydrous hydrogen atmosphere.

Still another object is to provide such a process in which there is a graduated layer of mutually compatible components in the seal between the metal and the ceramic.

Other objects and advantages of the present invention will become apparent from the following detailed description.

In accordance with the present invention, I have provided a method of forming a ceramic-to-metal seal, which comprises forming a mixture of a transition series metal oxide and a refractory metal, applying the mixture upon the ceramic substrate, and heating the resulting article in an atmosphere of flowing, anhydrous hydrogen to form the seal.

In the present invention the applied transition series metal oxide in the sealant composition is chemically compatible with the ceramic base. The applied metal oxide may suitably form a compound, a solid solution, or a eutectic, or otherwise be in chemical association with the ceramic member. The applied oxide further contains an element which will form an alloy with the refractory metal of the sealant composition. The element of the applied oxide is made available for alloying with the refractory metal in the coating mixture by partial reduction of the applied oxide in a reducing atmosphere of flowing, anhydrous hydrogen. The applied oxide is relatively stable so that it is only partially reduced, the remainder chemically associating with the ceramic substrate. A smooth, graduated transition seal is thus obtained, from the outer metal surface to a metal alloy to the applied oxide to the ceramic base.

The quality of the seal may be further enhanced by adding a small amount of the oxide of the refractory coating metal to the coating mixture. This oxide is relatively readily reduced in the anhydrous hydrogen atmosphere. The reduction of this oxide produces an extremely active metal which aids in the sintering of the metallic film during the firing and also increases the alloying rate. A metallic phase of improved structure and high strength is thus obtained.

Although the partial reduction of the applied oxide normally proceeds slowly, two factors enhance the reaction. The use of flowing, anhydrous hydrogen atmosphere will continuously remove the extremely small amount of water vapor formed from the reduction of the oxide, thus forcing the reaction to the right. Further, the resulting metallic element dissolves in the metal substrate as it is formed, thus removing it from the reaction and causing the reaction to proceed.

The transition series metal oxides, particularly of the first transition series, are chosen for the coating mixture. Examples of such oxides which can be used in the present method for forming a ceramic-to-metal seal are: $Co_3O_4$, $CoO$, $FeO$, $Fe_2O_3$, $Fe_3O_4$, $Ga_2O_3$, $NiO$, $Rh_2O_3$, $Cr_2O_3$, $La_2O_3$, $Y_2O_3$, $V_2O_3$, and $V_2O_5$. $B_2O_3$ is also satisfactory and is included in the comprehension of a transition series oxide for the present purposes.

The refractory metals, i.e., with melting points about about 1900° C., are particularly suitable in view of their high melting points and low thermal expansion characteristics which correlate well with those of the ceramic substrate. The mechanical properties of ceramics are better under compression than tension. Satisfactory examples are Cr, W, Re and Mo.

Concerning the type of chemical association of the applied oxide and the substrate ceramic, solubility (up to about 25%) in $Al_2O_3$ is displayed by $\alpha$-$Fe_2O_3$, $Cr_2O_3$, $V_2O_3$, $Rh_2O_3$, and $\alpha$-$Ga_2O_3$. BeO forms compounds with the applied oxide of $BeCr_2O_4$, $BeAl_2O_4$, $Be_2Y_2O_5$, $Be_2La_2O_5$, $BeGa_4O_7$, and $Be_3B_2O_6$. Alumina forms compounds of $NiAl_2O_4$, $CoAl_2O_4$ and $FeAl_2O_4$. Metallic phase alloys obtained by partial reduction of the applied oxide are (W, Mo, Re)—Cr; (W, Mo, Re)—Fe; (W, Mo, Re)—Ni; (W, Mo, Re)—V; (W, Mo, Re)—Co; (W, Mo, Re)—Fe—Co; (W, Mo, Re)—Fe—Ni; (W, Mo, Re)—Ni—Co. The refractory metal constituent of the coating is indicated by enclosure in the parenthesis; one or more may be included in the alloy.

Overall coating composition combinations of applied oxide and metal are shown below, and also compositions containing an amount of the oxide of the refractory coating metal, which is reduced in the sintering.

(Re, W, Mo)—$Cr_2O_3$
(Re, W, Mo)—$Fe_2O_3$
(Re, W. Mo)—$V_2O_3$
(Re, W, Mo)—$Rh_2O_3$
(Re, W, Mo)—$B_2O_3$
(Re, W, Mo)—$Ga_2O_3$ (Re, W, Mo)—NiO
(Re, W, Mo)—Fe$_2$O$_3$—Co$_3$O$_4$
(Re, W, Mo)—Fe$_2$O$_3$—CoO
(Re, W, Mo)—Fe$_2$O$_3$—NiO
(Re, W, Mo)—NiO—CoO
(Re, W, Mo)—(Re, W, Mo—O$_3$—Cr$_2$O$_3$
(Re, W, Mo)—(Re, W, Mo)O$_3$—Fe$_2$O$_3$
(Re, W, Mo)—(Re, W, Mo)O$_3$—V$_2$O$_3$
(Re, W, Mo)—Re, W, Mo)O$_3$—Rh$_2$O$_3$
(Re, W, Mo)—(Re, W, Mo)O$_3$—B$_2$O$_3$
(Re, W, Mo)—(Re, W, Mo)O$_3$—Ga$_2$O$_3$

Re$_2$O$_7$ may be used in place of ReO$_3$ in the above compositions.

The percentages of the components of the dry sealant composition may vary over a considerable range without being critical. The refractory metal constitutent (e.g. Mo) may comprise 65–85%, the refractory metal oxide (e.g. MoO$_3$ 0–15%, and the transition series metal oxide (e.g. Cr$_2$O$_3$) 5–30%. A preferred composition consists of about 80% refractory metal, 15% refractory metal oxide, and 5% transition series metal oxide.

The bonding composition is applied in the following general manner. Relatively fine powders (e.g. −325 mesh) of the applied oxide and metal substrate are mixed and then made into a suspension or slurry by means known to the art. For example, powder may be mixed with water in a mortar or pestle or some other homogenizer to form a paint, which may then be applied onto the ceramic member by such known methods as dipping, painting, or spraying. The powders may also be formed into a paint using common organic solvents or binders such as acetone, nitrocellulose, methyl amyl acetate, methylethyl ketone, benzene, toluol, ethylmethyl ketone, and natural and synthetic resins. After the paint is applied to the surface of the ceramic it is permitted to air dry, and then is heated slowly to approximately 100° C. in air to remove water. The ceramic is then placed in a ceramic boat into a furnace with a flowing, anhydrous hydrogen gas atmosphere. The hydrogen is purified and dried by passing over a palladium catalyst and then through activated Al$_2$O$_3$. It typically has a −70° F. dew point.

The firing is suitable conducted at an elevated temperature, below the melting point of the ceramic substrate, in order to sinter the coating composition and achieve satisfactory adherence to the ceramic body.

For example, the ceramic body may be heated for about 1 to 4 hours at about 1600° to 1800° C. with hydrogen flowing at a rate of about 2 to 12 cubic feet per hour. Preferred firing conditions comprise heating for about 2 hours at about 1750° C. in hydrogen flowing at about 5 c.f.h. The boat with its contents is then removed slowly from the furnace. A dense uniform coating of metal alloy is thus formed on the ceramic and is chemically bonded to it. The metallic film is free of micro cracks and is independent of the purity, density, or microstructure of the underlying ceramic substrate. The resulting metal-ceramic body may then be joined, if desired or required, to metallic structural members, for example, a metal tube shield, by methods known to the art including brazing. Conventional brazes may be used, for example silver and copper-silver eutectic.

The following examples are offered to illustrate my invention in greater detail.

*Example I*

Eighty grams of −325 mesh molybdenum metal, 15 grams of reagent grade molybdenum trioxide, and 5 grams of reagent grade chromium sesquioxide are weighed and placed into an aluminum oxide mortar. The three components are ground and homogenized in the mortar with an aluminum oxide pestle. Distilled water is then slowly added with constant stirring until a slurry with paint-like consistency is formed. The color of the resulting suspension is metallic steel blue, resulting from the interaction of the aqueous molybdenum trioxide and the molybdenum metal. The mixture is then applied by brushing to the ground surface of clean, dense, hot-pressed beryllium oxide ceramic of 99.9% minimum purity. The coating is air-dried and then fired in an atmosphere of pure dry hydrogen (−70° F. dew point) flowing at a rate of about 5 c.f.h. for two hours at 1750° C. A strong adherent coating of metal (molybdenum-chromium alloy) is formed on the beryllia ceramic. The bond consists of the following transition layers:

(1) BeO
(2) Be$_2$Cr$_2$O$_4$
(3) Cr$_2$O$_3$
(4) Mo—Cr alloy
(5) Mo

*Examples II–VIII*

The procedure of Example I is followed with the indicated sealant compositions. In Examples IV, V, VI, and VIII the substrate ceramic is Al$_2$O$_3$; in Example VII, BeO; and in Examples II and III the composition is applied on both Al$_2$O$_3$ and BeO bases. Nitrocellulose is the carrier medium in Example V, and acetone in Example VIII. Graduated bonds of high quality having analogous layers to that in Example I are obtained.

II   80% Re, 15% RoO$_3$, 5% Cr$_2$O$_3$—(Al$_2$O$_3$), (BeO)
III  75% W, 25% Cr$_2$O$_3$—(Al$_2$O$_3$), (BeO)
IV   73% Mo, 7% MoO$_3$, 20% Fe$_2$O$_3$—(Al$_2$O$_3$)
V    80% Mo, 15% MoO$_3$, 5% V$_2$O$_3$—(Al$_2$O$_3$)
VI   80% W, 15% WO$_3$, 5% Rh$_2$O$_3$—(Al$_2$O$_3$)
VII  80% Mo, 15% MoO$_3$, 5% B$_2$O$_3$—(BeO)
VIII 80% Mo, 10% MoO$_3$, 10% NiO—(Al$_2$O$_3$)

The above examples are illustrative rather than restrictive of my invention, and it should be understood that I do not wish to be limited thereto since many modifications may be made and I contemplate to cover by the appended claims such modifications as fall within the spirit of my invention.

I claim:

1. A method of chemically bonding a metal to a ceramic body which comprises forming a mixture consisting essentially of powders of a transition metal oxide and a refractory metal, forming a fluid suspension of the powder mixture, applying the resulting suspension on the ceramic body, and firing the coated body at an elevated temperature in a flowing, anhydrous hydrogen atmosphere to provide a uniform metal coating on said ceramic body.

2. The method of claim 1 wherein said coating metal comprises approximately 60–85 percent of said powder mixture and said metal oxide comprises approximately 5–30 percent of said powder mixture.

3. The method of claim 1 wherein said coated ceramic body is heated for approximately 1–4 hours at approximately 1600–1800° C. in flowing, anhydrous hydrogen.

4. A method of forming a metal-to-ceramic seal which comprises forming a powder mixture consisting essentially of a transition metal oxide, a refractory metal, and a small amount of an oxide of said refractory metal, forming a suspension of said powder mixture, applying the resulting suspension on said ceramic body, and heating the coated ceramic body at an elevated temperature in flowing, anhydrous hydrogen.

5. The method of claim 4 wherein said powder mixture comprises approximately 65–85 percent of said refractory metal, up to 15 percent said refractory metal oxide, and 5–35 percent transition metal oxide.

6. A method of bonding a metal to a ceramic which comprises forming a mixture consisting essentially of at least one transition series metal oxide selected from the group consisting of Co$_3$O$_4$, CoO, B$_2$O$_3$, Fe$_2$O$_3$, La$_2$O$_3$, Fe$_3$O$_4$, FeO, Ga$_2$O$_3$, NiO, Rh$_2$O$_3$, Cr$_2$O$_3$, Y$_2$O$_3$, V$_2$O$_3$, and V$_2$O$_5$, and at least one refractory metal selected from the group consisting of Cr, Mo, Re, and W, forming a fluid suspension of the resulting powder mixture, applying said suspension on said ceramic body, and firing the coated ceramic body at an elevated temperature in a flowing, anhydrous hydrogen atmosphere.

7. The method of claim 6 wherein said ceramic body is heated at a temperature of about 1600–1800° C. for about 1–4 hours in anhydrous hydrogen flowing at a rate of about 2–12 c.f.h.

8. The method of claim 6 wherein an oxide of said refractory metal in the powder mixture is additionally added to said mixture.

9. The method of claim 8 wherein said powder mixture comprises approximately 65–85 percent of said refractory metal component, up to 15 percent of the oxide of said refractory metal, and 5–30 percent of said transition series metal oxide.

10. A method of forming a ceramic-to-metal seal which comprises forming a powder mixture consisting essentially of about 5–30 percent of at least one transition series metal oxide selected from the group consisting of $Co_3O_4$, $CoO$, $B_2O_3$, $Fe_2O_3$, $Fe_3O_4$, $FeO$, $Ga_2O_3$, $NiO$, $Rh_2O_3$, $La_2O_3$, $Cr_2O_3$, $Y_2O_3$, $V_2O_3$, and $V_2O_5$; about 65–85 percent of a refractory metal selected from the group consisting of Cr, Mo, Re, and W; and up to 15 percent of an oxide of said refractory metal, forming an aqueous suspension of the powder mixture, applying said suspension on said ceramic body, and firing the coated ceramic body at a temperature of about 1600–1800° C. in anhydrous hydrogen flowing at a rate of about 2–12 c.f.h. for about 1–4 hours.

11. A method of forming a metal bond on BeO which comprises forming a powder mixture consisting essentially of approximately 80 weight percent molybdenum, 15 weight percent molybdenum trioxide, and 5 weight percent chromium sesquioxide, forming a suspension of said powder mixture, applying the resulting suspension on said BeO, and then firing the coated powder in anhydrous hydrogen flowing at a rate of about 2–12 c.f.h. for about two hours at about 1750° C.

12. A method of applying a metal coating on a ceramic body which comprises forming a mixture consisting essentially of about 75 percent tungsten and 25 percent $Cr_2O_3$, forming a suspension of the powder mixture, applying the suspension on said ceramic body, and firing the coated ceramic body at an elevated temperature in flowing, anhydrous hydrogen.

13. A method of forming a metal bond on a BeO body which comprises forming a powder mixture consisting essentially of approximately 80 percent Mo, 15 percent $MoO_3$, and 5 percent $B_2O_3$, forming a suspension of the powder mixture, applying the suspension on said BeO, and firing the coated ceramic body at an elevated temperature in flowing, anhydrous hydrogen to obtain said bond.

14. A method of forming a metal-to-alumina bond which comprises forming a powder mixture consisting essentially of about 80 percent Mo, about 10 percent $MoO_3$, and about 10 percent NiO, forming a suspension of said powder mixture, applying this suspension on said alumina, and heating the coated body at a temperature of about 1600–1800° C. in anhydrous hydrogen flowing at a rate of about 2–12 c.f.h. to obtain said bond.

15. A method of forming a metal bond on a ceramic surface which comprises forming a powder mixture consisting essentially of approximately 80 percent Re, 15 percent $ReO_3$, and 5 percent $Cr_2O_3$, forming a suspension of the resulting powder mixture, applying the resulting suspension on said ceramic body, and then heating the coated ceramic body at an elevated temperature in anhydrous flowing hydrogen.

References Cited by the Examiner
UNITED STATES PATENTS 3,132,044    5/1964    Pearsall _____ 117—123
3,215,555    11/1965    Krey _____ 117—123

ALFRED L. LEAVITT, *Primary Examiner.*

W. L. SOFFIAN, *Assistant Examiner.*